(12) United States Patent
Asprion et al.

(10) Patent No.: US 7,887,620 B2
(45) Date of Patent: Feb. 15, 2011

(54) REMOVAL OF CARBON DIOXIDE FROM FLUE GASES

(75) Inventors: Norbert Asprion, Ludwigshafen (DE); Iven Clausen, Mannheim (DE); Ute Lichtfers, Karlsruhe (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 12/304,312

(22) PCT Filed: Jun. 13, 2007

(86) PCT No.: PCT/EP2007/055820
§ 371 (c)(1),
(2), (4) Date: Dec. 11, 2008

(87) PCT Pub. No.: WO2007/144372
PCT Pub. Date: Dec. 21, 2007

(65) Prior Publication Data
US 2009/0199711 A1    Aug. 13, 2009

(30) Foreign Application Priority Data
Jun. 13, 2006    (EP) .................................. 06115408

(51) Int. Cl.
*B01D 53/14*    (2006.01)
(52) U.S. Cl. ........................................ 95/236; 423/228
(58) Field of Classification Search .................. 95/161, 95/236; 423/228, 229
See application file for complete search history.

(56) References Cited
U.S. PATENT DOCUMENTS
6,165,433 A    12/2000    Chakravarti et al.

2004/0036055 A1*    2/2004    Asprion et al. ............... 252/180

FOREIGN PATENT DOCUMENTS
DE    4201921 A1    7/1992

(Continued)

OTHER PUBLICATIONS

English-language translation of the International Preliminary Report on Patentability (IPER) for international application PCT/EP2007/055820 mailed Feb. 12, 2009.

(Continued)

*Primary Examiner*—Duane Smith
*Assistant Examiner*—Tiffany N Palmer
(74) *Attorney, Agent, or Firm*—Connolly Bove Lodge & Hutz LLP

(57) ABSTRACT

A description is given of a process for removing carbon dioxide from gas streams in which the partial pressure of the carbon dioxide is less than 200 mbar, in particular flue gases, the gas stream being contacted with a liquid absorption medium which comprises an aqueous solution (A) of a tertiary aliphatic alkanolamine and (B) an activator of the formula $$R^1-NH-R^2-NH_2,$$

Figure 1:
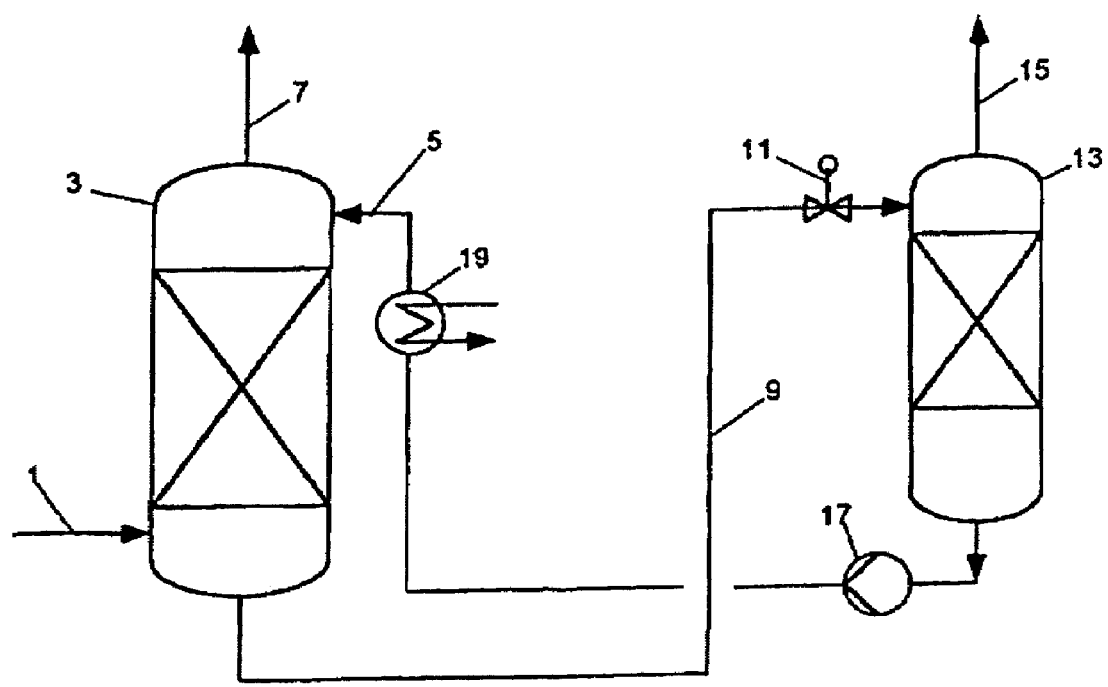

where $R^1$ is $C_1$-$C_6$-alkyl and $R^2$ is $C_2$-$C_6$-alkylene, the sum of the concentrations of A and B being 2.5 to 7 mol/l, and the molar ratio of B to A being in the range of 1:3 to 1.5:1. The activator is, for example, 3-methylaminopropylamine, the tertiary aliphatic amine methyldiethanolamine, methyldiisopropanolamine or n-butyldiethanolamine. The process permits substantial removal of carbon dioxide and the regeneration of the absorption medium is possible with relatively low energy consumption.

20 Claims, 1 Drawing Sheet

FOREIGN PATENT DOCUMENTS

| | | |
|---|---|---|
| EP | 0 331 788 A1 | 9/1989 |
| EP | 879 631 A1 | 11/1998 |
| WO | WO-02/07862 A1 | 1/2002 |
| WO | WO-02/09849 A2 | 2/2002 |
| WO | WO-2005/087350 A1 | 9/2005 |
| WO | WO-2007045679 A1 | 4/2007 |

OTHER PUBLICATIONS

N. Asprion "Nonequillbrium Rate-Based Simulation of Reactive Systems: Simulation Model Heat Transfer, and Influence of Film Discretization," Ind. Eng. Chem. Res. 2006, 45, 2045-2069, published on Web Feb. 8, 2006.

* cited by examiner

REMOVAL OF CARBON DIOXIDE FROM FLUE GASES

This application is a national phase of PCT/EP2007/055820, filed on Jun. 13, 2007 which claims priority to EP 06115408.4 filed Jun. 13, 2006, the entire contents of all are hereby incorporated by reference.

The present invention relates to a process for removing carbon dioxide from gas streams having low carbon dioxide partial pressures, in particular for removing carbon dioxide from flue gases.

The removal of carbon dioxide from flue gases is desirable for many reasons, in particular, however, for reducing the emission of carbon dioxide which is considered the principal cause of what is termed the greenhouse effect.

On an industrial scale, for the removal of acid gases, such as carbon dioxide, from fluid streams, frequently use is made of aqueous solutions of organic bases, for example alkanolamines, as absorption media. When acid gases are dissolved, ionic products are formed from the base and the acid gas components. The absorption medium can be regenerated by heating, expansion to a lower pressure, or stripping, the ionic products back-reacting to form acid gases and/or the acid gases being stripped off by steam. After the regeneration process, the absorption medium can be reused.

Flue gases have very low carbon dioxide partial pressures, since they generally are produced at a pressure close to atmospheric pressure and typically comprise 3 to 13% by volume of carbon dioxide. To achieve effective removal of carbon dioxide, the absorption medium must have a high acid gas affinity which generally means that the carbon dioxide absorption proceeds highly exothermically. On the other hand, a high acid gas affinity causes an increased energy expenditure in regeneration of the absorption medium.

EP-A 879 631 describes a process for removing $CO_2$ from a combustion gas by contacting the combustion gas at atmospheric pressure with an aqueous amine solution. The amine solution comprises a secondary and a tertiary amine, each in a concentration of 10 to 45% by weight.

U.S. Pat. No. 6,165,433 relates to carbon dioxide removal from a gas stream, the carbon dioxide partial pressure of which is 10 psia or less, using a solvent which comprises water, 5 to 35% by weight of a fast amine and 5 to 50% by weight of a slow amine. Fast amines are monoethanolamine, diethanolamine, piperazine and diisopropanolamine. Slow amines are methyldiethanolamine, triethanolamine, and sterically hindered amines such as 2-amino-2-methyl-1-propanol.

WO 02/07862 describes a process and a wash liquid for deacidifying a fluid stream. The wash liquid comprises a tertiary aliphatic alkanolamine and an activator such as 3-methylaminopropylamine. Treating fluid streams with low carbon dioxide partial pressures is not claimed.

WO 2005/087350 discloses a process for removing carbon dioxide from flue gases using a liquid absorption medium which comprises a tertiary aliphatic amine and an activator such as 3-methylaminopropylamine. The tertiary aliphatic amine is said to have a reaction enthalpy $\Delta_R H$ of the protonation reaction which is greater than that of methyldiethanolamine. The absorption medium is said to comprise 20 to 60% by weight of tertiary aliphatic amine and 1 to 10% by weight of activator.

The object of the invention is to specify a process which permits a substantial removal of carbon dioxide from gas streams having low carbon dioxide partial pressures and in which regeneration of the absorption medium is possible with comparatively low energy expenditure.

The object is achieved by a process for removing carbon dioxide from a gas stream in which the partial pressure of the carbon dioxide in the gas stream is less than 200 mbar, the gas stream being contacted with a liquid absorption medium which comprises an aqueous solution of (A) a tertiary aliphatic alkanolamine and (B) an activator of the formula

where $R^1$ is $C_1$-$C_6$-alkyl, preferably $C_1$-$C_2$-alkyl, and $R^2$ is $C_2$-$C_6$-alkylene, preferably $C_2$-$C_3$-alkylene, the sum of the concentrations of (A) and (B) in the absorption medium being 2.5 to 7 mol/l and the molar ratio of (B) to (A) being in the range from 1:3 to 1.5:1.

The absorption medium used according to the invention comprises a concentration of the activator (B) which is markedly increased compared with that of WO 2005/087350. It is surprising that thereby the energy expenditure for regeneration of the absorption medium can be reduced. Customarily, it is assumed that high activator concentrations have an adverse effect on the energy requirement.

A preferred activator is 3-methylaminopropylamine (MAPA).

Suitable tertiary aliphatic alkanolamines (A) are, for example, methyldiethanolamine (MDEA), methyldiisopropanolamine and n-butyldiethanolamine, of which methyldiethanolamine and methyldiisopropanolamine are most-preferred. As component (A), use can also be made of mixtures of various tertiary aliphatic alkanolamines.

Preferably, the sum of the concentrations of (A) and (B) in the absorption medium is 2.8 to 6.3 mol/l, in particular 3 to 6 mol/l.

Preferably the molar ratio of (B) to (A) is in the range of 1:2.5 to 1.3:1, in particular 1:2 to 1.1:1.

The aliphatic amines are used in the form of their aqueous solutions. The solutions can additionally comprise physical solvents which are selected, for example, from cyclotetramethylene sulfone (sulfolane) and derivatives thereof, aliphatic acid amides (acetylmorpholine, N-formylmorpholine), N-alkylated pyrrolidones and corresponding piperidones such as N-methylpyrrolidone (NMP), propylene carbonate, methanol, dialkyl ethers of polyethylene glycols and mixtures thereof.

Where present, in the process of the invention, in addition to carbon dioxide, customarily other acid gases such as for example $H_2S$, $SO_2$, $CS_2$, HCN, COS, disulfides or mercaptans, are also removed from the gas stream.

The gas stream is generally a gas stream which is formed in the following ways:

a) oxidation of organic substances for example combustion gases or flue gases, b) composting and storage of waste materials comprising organic substances, or c) bacterial decomposition of organic substances.

The oxidation can be carried out with appearance of flames, that is as conventional combustion, or as oxidation without appearance of flames, for example in the form of catalytic oxidation or partial oxidation. Organic substances which have been subjected to combustion are customarily fossil fuels such as coal, natural gas, petroleum, petrol, diesel, raffinates or kerosene, biodiesel or waste materials having a content of organic substances. Starting materials of the catalytic (partial) oxidation are, for example, methanol or methane which can be converted to formic acid or formaldehyde.

Waste substances which are subjected to oxidation, composting or storage are typically domestic refuse, plastic wastes or packaging waste.

Combustion of the organic substances usually proceeds in customary combustion plants by air. The composting and storage of waste materials comprising organic substances generally proceeds at refuse landfills. The exhaust gas or the exhaust air of such plants can advantageously be treated by the process according to the invention.

As organic substances for bacterial decomposition, use is customarily made of stable manure, straw, liquid manure, sewage sludge, fermentation residues and the like. Bacterial decomposition proceeds, for example, in conventional biogas plants. The exhaust air of such plants can advantageously be treated by the process according to the invention.

The process is also suitable for treating the exhaust gases of fuel cells or chemical synthesis plants which serve for (partial) oxidation of organic substances.

In addition, the process according to the invention can of course also be employed to treat unburned fossil gases such as natural gas, for example coal-seam gases, that is gases produced in the extraction of coal, which are collected and compressed.

Generally, these gas streams under standard conditions comprise less than 50 mg/m$^3$ of sulfur dioxide.

The starting gases can either have the pressure which roughly corresponds to the pressure of the ambient air, that is, for example atmospheric pressure or a pressure which deviates from atmospheric pressure by up to 1 bar.

Devices suitable for carrying out the process according to the invention comprise at least one scrubbing column, for example random-packing columns, ordered-packing columns and tray columns, and/or other absorbers such as membrane contactors, radial stream scrubbers, jet scrubbers, Venturi scrubbers and rotary spray scrubbers. The gas stream is preferably treated with the absorption medium in a scrubbing column in counterflow current. The gas stream is generally fed into the lower region of the column and the absorption medium into the upper region of the column.

The temperature of the absorption medium in the absorption step is generally about 30 to 70° C., when a column is used, for example, 30 to 60° C. at the top of the column and 40 to 70° C. at the bottom of the column. A product gas (Beigas) low in acid gas components, that is a product gas depleted in these components, is obtained and an absorption medium loaded with acid gas components is obtained.

The carbon dioxide can be released from the absorption medium loaded with the acid gas components in one regeneration step, a regenerated absorption medium being obtained. In the regeneration step, the loading of the absorption medium is decreased and the resultant regenerated absorption medium is preferably subsequently returned to the absorption step.

Generally, the loaded absorption medium is regenerated by a) heating, for example to 70 to 110° C., b) expansion, c) stripping with an inert fluid or a combination of two or all of these measures.

Generally, the loaded absorption medium is heated for regeneration and the carbon dioxide released is separated off, for example in a desorption column. Before the regenerated absorption medium is again introduced into the absorber, it is cooled to a suitable absorption temperature. In order to utilize the energy present in the hot regenerated absorption medium, it is preferred to preheat the loaded absorption medium from the absorber by heat exchange with the hot regenerated absorption medium. By means of the heat exchange the loaded absorption medium is brought to a higher temperature so that a lower energy usage is required in the regeneration step. By means of the heat exchange, also, partial regeneration of the loaded absorption medium can already proceed with release of carbon dioxide. The resultant gas-liquid mixed phase stream is passed to a phase separation vessel from which the carbon dioxide is taken off; the liquid phase is passed to the desorption column for complete regeneration of the absorption medium.

Upstream of the absorption medium treatment according to the invention, the flue gas is preferably subjected to scrubbing with an aqueous liquid, in particular water, in order to cool the flue gas and moisten it (quench). In the scrubbing, dusts or gaseous impurities such as sulfur dioxide can also be removed.

The invention will be explained in more detail on the basis of the accompanying FIGURE and the following example.

FIG. 1 is a diagrammatic view of a plant suitable for carrying out the process according to the invention.

According to FIG. 1, via a feedline 1, a suitably pretreated carbon dioxide-comprising combustion gas is contacted in countercurrent flow in an absorber 3 with the regenerated absorption medium which is fed via the absorption medium line 5. The absorption medium removes carbon dioxide from the combustion gas by absorption; a clean gas low in carbon dioxide is isolated via an exhaust gas line 7. Via an absorption medium line 9 and a throttling valve 11, the carbon-dioxide-loaded absorption medium is fed to a desorption column 13. In the lower part of the desorption column 13 the loaded absorption medium is heated by means of a heater (which is not shown) and regenerated. The carbon dioxide released leaves the desorption column 13 via the exhaust gas line 15. The regenerated absorption medium is subsequently fed by means of a pump 17 via a heat exchanger 19 back into the absorption column 3.

EXAMPLE

This example is based on $CO_2$ removal from a fluid stream simulated by means of simulation software. The fundamentals of this simulation method are described in N. Asprion, Nonequilibrium Rate-Based Simulation of Reactive Systems: Simulation Model, Heat Transfer, and Influence of Film Discretization, Ind. Eng. Chem. Res.; 2006; 45, 2054-2069.

The simulation is based on the following assumptions:

Absorption medium: water/MDEA/MAPA mixture having 40% by weight total amine content;

Feed gas: $CO_2$ content 12.9 mol %, temperature 47° C., pressure 1.1 bar (absolute), Absorption medium temperature: 45° C.;

90% $CO_2$ removal.

A simple absorber-desorber circuit having internal heat recovery is used as a basis in a countercurrent flow heat exchanger in which the hot regenerated solution is used for heating the colder loaded solution. The temperature difference between the two streams is 10° C. at the cold end of the countercurrent flow heat exchanger. The desorption is carried out in a stripper at 2.5 bar. Absorber column having 17 m packing height (type IMTP 50), desorber 10 m packing height (type IMTP 50).

The phase equilibria were calculated using the Pitzer model (K. S. Pitzer, Activity Coefficients in Electrolyte Solutions 2nd ed., CRC-Press, 1991, Chapter 3, Ion Interaction Approach: Theory, the parameters were adapted to phase equilibria measurements in the $CO_2/H_2O/MDEA/MAPA$ system).

The composition of the absorption medium was varied and the regeneration energy requirement necessary in each case was determined. It was found that at an activator concentration of 16% by weight MAPA only 89% of the evaporator energy and 69% of the solvent circulation rate were required compared with a solution having 10% by weight activator concentration.

The invention claimed is:

1. A process for removing carbon dioxide from a gas stream in which the partial pressure of the carbon dioxide in the gas stream is less than 200 mbar, the gas stream being contacted with a liquid absorption medium which comprises an aqueous solution of
   (A) a tertiary aliphatic alkanolamine and
   (B) an activator of the formula

   $R^1-NH-R^2-NH_2$, where $R^1$ is $C_1$-$C_6$-alkyl and $R^2$ is $C_2$-$C_6$-alkylene,
   the sum of the concentrations of A and B in the absorption medium being 2.5 to 7 mol/l and the molar ratio of B to A being in the range from 1:3 to 1.5:1.

2. The process according to claim 1, wherein the activator is 3-methylamino-propylamine.

3. The process according to claim 1, wherein the tertiary aliphatic amine A is selected from methyldiethanolamine, methyldiisopropanolamine and n-butyldiethanolamine.

4. The process according to claim 1, wherein the sum of the concentrations of A and B in the absorption medium is 2.8 to 6.3 mol/l.

5. The process according to claim 1, wherein the molar ratio of B to A is in the range of 1:2.5 to 1.3:1.

6. The process according to claim 1, wherein the gas stream originates from
   a) the oxidation of organic substances,
   b) the composting or storage of waste materials comprising organic substances, or
   c) the bacterial decomposition of organic substances.

7. The process according to claim 1, wherein the loaded absorption medium is regenerated by
   a) heating,
   b) expansion,
   b) stripping with an inert fluid
   or a combination of two or all of these measures.

8. The process according to claim 2, wherein the tertiary aliphatic amine A is selected from methyldiethanolamine, methyldiisopropanolamine and n-butyl-diethanolamine.

9. The process according to claim 2, wherein the sum of the concentrations of A and B in the absorption medium is 2.8 to 6.3 mol/l.

10. The process according to claim 3, wherein the sum of the concentrations of A and B in the absorption medium is 2.8 to 6.3 mol/l.

11. The process according to claim 2, wherein the molar ratio of B to A is in the range of 1:2.5 to 1.3:1.

12. The process according to claim 3, wherein the molar ratio of B to A is in the range of 1:2.5 to 1.3:1.

13. The process according to claim 4, wherein the molar ratio of B to A is in the range of 1:2.5 to 1.3:1.

14. The process according to claim 2, wherein the gas stream originates from
   a) the oxidation of organic substances,
   b) the composting or storage of waste materials comprising organic substances, or
   c) the bacterial decomposition of organic substances.

15. The process according to claim 3, wherein the gas stream originates from
   a) the oxidation of organic substances,
   b) the composting or storage of waste materials comprising organic substances, or
   c) the bacterial decomposition of organic substances.

16. The process according to claim 4, wherein the gas stream originates from
   a) the oxidation of organic substances,
   b) the composting or storage of waste materials comprising organic substances, or
   c) the bacterial decomposition of organic substances.

17. The process according to claim 5, wherein the gas stream originates from
   a) the oxidation of organic substances,
   b) the composting or storage of waste materials comprising organic substances, or
   c) the bacterial decomposition of organic substances.

18. The process according to claim 2, wherein the loaded absorption medium is regenerated by
   a) heating,
   b) expansion,
   c) stripping with an inert fluid
   or a combination of two or all of these measures.

19. The process according to claim 3, wherein the loaded absorption medium is regenerated by
   a) heating,
   b) expansion,
   d) stripping with an inert fluid
   or a combination of two or all of these measures.

20. The process according to claim 4, wherein the loaded absorption medium is regenerated by
   a) heating,
   b) expansion,
   e) stripping with an inert fluid
   or a combination of two or all of these measures.

* * * * *